US012448329B2

(12) United States Patent
Boon et al.

(10) Patent No.: US 12,448,329 B2
(45) Date of Patent: Oct. 21, 2025

(54) SHRINKAGE REDUCER FOR MINERAL BINDER COMPOSITION AND ITS USE

(71) Applicant: SIKA TECHNOLOGY AG, Baar (CH)

(72) Inventors: Gary Boon, Dubai (AE); Maxime Liard, Zürich (CH); Didier Lootens, Küssnacht (CH); Lolita Hauguel, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 845 days.

(21) Appl. No.: 17/439,491

(22) PCT Filed: Mar. 13, 2020

(86) PCT No.: PCT/EP2020/056847
§ 371 (c)(1),
(2) Date: Sep. 15, 2021

(87) PCT Pub. No.: WO2020/187740
PCT Pub. Date: Sep. 24, 2020

(65) Prior Publication Data
US 2022/0153644 A1 May 19, 2022

(30) Foreign Application Priority Data
Mar. 15, 2019 (EP) .................... 19163223

(51) Int. Cl.
C04B 24/26 (2006.01)
B33Y 70/00 (2020.01)
C04B 14/06 (2006.01)
C04B 24/02 (2006.01)
C04B 24/08 (2006.01)
C04B 24/38 (2006.01)
C04B 24/42 (2006.01)
C04B 28/06 (2006.01)
C04B 40/00 (2006.01)
C04B 103/00 (2006.01)
C04B 103/44 (2006.01)
C04B 103/50 (2006.01)
C04B 111/34 (2006.01)

(52) U.S. Cl.
CPC .......... C04B 24/2647 (2013.01); B33Y 70/00 (2014.12); C04B 14/06 (2013.01); C04B 24/02 (2013.01); C04B 24/08 (2013.01); C04B 24/383 (2013.01); C04B 24/42 (2013.01); C04B 28/065 (2013.01); C04B 40/0042 (2013.01); C04B 2103/0051 (2013.01); C04B 2103/44 (2013.01); C04B 2103/50 (2013.01); C04B 2111/34 (2013.01)

(58) Field of Classification Search
None
See application file for complete search history.

(56) References Cited

U.S. PATENT DOCUMENTS

| 9,139,627 | B2* | 9/2015 | Riebel ..................... C08L 97/02 |
| 2007/0204765 | A1 | 9/2007 | Le Roy-Delage et al. |
| 2010/0190888 | A1* | 7/2010 | Gaeberlein ......... C04B 24/2688 524/5 |
| 2010/0285224 | A1 | 11/2010 | Fisher |
| 2014/0371351 | A1* | 12/2014 | Dantin .................... C04B 28/04 524/5 |
| 2014/0371352 | A1* | 12/2014 | Dantin .................... B01F 23/54 524/5 |
| 2016/0083295 | A1* | 3/2016 | Stahl .................. C04B 40/0039 523/218 |
| 2018/0282233 | A1* | 10/2018 | Bürge ..................... C04B 24/02 |

FOREIGN PATENT DOCUMENTS

| CN | 107059470 A * | 8/2017 | ............. B41M 5/52 |
| CN | 107892905 A * | 4/2018 | |
| DE | 19529348 A1 | 2/1997 | |
| FR | 3042494 A1 | 4/2017 | |
| JP | 6030283 B2 | 11/2016 | |
| KR | 100971111 B1 | 7/2010 | |
| RU | 2404146 C1 | 11/2010 | |
| WO | 2006/072273 A1 | 7/2006 | |
| WO | 2012/162292 A2 | 11/2012 | |
| WO | WO-2013131583 A1 * | 9/2013 | ............ B01F 3/1214 |
| WO | WO-2013131584 A1 * | 9/2013 | ............ B01F 23/511 |
| WO | 2017/212044 A1 | 12/2017 | |
| WO | 2019/030255 A1 | 2/2019 | |

OTHER PUBLICATIONS

Machine translation of CN 107892905 A, retrieved Sep. 2024 (Year: 2024).*
Machine translation of CN 107059470 A, retrieved Sep. 2024 (Year: 2024).*
Jun. 4, 2020 International Search Report issued in International Patent Application No. PCT/EP2020/056847.
Jun. 4, 2020 Written Opinion issued in International Patent Application No. PCT/EP2020/056847.
T.T. Le et al.; "Mix design and fresh properties for high-performance printing concrete"; Materials and Structures; 2012; vol. 45; pp. 1221-1232.
Abstract of Russian Patent Application No. RU95111451A, (Sep. 27, 1996).

* cited by examiner

Primary Examiner — Katarzyna I Kolb
(74) Attorney, Agent, or Firm — Oliff PLC

(57) ABSTRACT

An additive, in particular a shrinkage reducing agent, for mineral binder compositions including at least one super absorbent polymer SAP and at least one defoamer D. Further, a mineral binder composition including the additive, processes and methods for the mixing thereof, and to hardened articles obtainable therefrom.

12 Claims, 1 Drawing Sheet

Figure 1: Hardened Prism (Example 8)
Figure 2: Hardened Prism (Example 9)
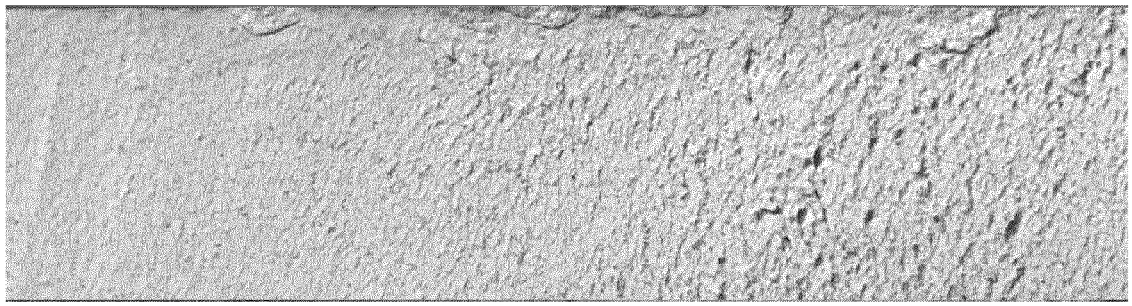

SHRINKAGE REDUCER FOR MINERAL BINDER COMPOSITION AND ITS USE

TECHNICAL FIELD

The invention relates to an additive for mineral binder compositions, in particular a shrinkage reducing agent for mineral binder compositions, and to the use thereof. The invention further relates to a mineral binder composition comprising the additive, hardened articles obtainable therefrom and a process for the preparation of the mineral binder composition.

BACKGROUND OF THE INVENTION

It has long been known to those skilled in the art that mineral binder compositions, especially cementitious binder compositions, are subject to a change in volume, most often a contraction, during the setting and drying process. This change in volume, especially shrinkage, is of great significance for suitability for use, for sustained service life and for strength of the hardened building material, since it is frequently the cause of the formation of cracks, of the dishing of screeds and further faults. In this way, for example, water, dissolved salts and air get through cracks into the interior of the concrete, mortar, screed or slurries and, for example, promote corrosion in reinforced concrete constructions. Moreover, the cyclical stress caused by frost and thaw, with unwanted penetration of water into the building material through cracks, leads to mechanical stresses and early material failure.

The construction industry is therefore trying to ensure dimensional stability and especially limit drying shrinkage and/or drying cracking to a minimum through a wide variety of different measures. Attempts have been made to counteract shrinkage not just via the way in which construction is executed and choice of optimized cementitious binder compositions, but in recent times to an increased degree also via the addition of additives. In the early 1980s, the first shrinkage reducers were developed and successfully used in Japan. Since then, the use of various shrinkage reducers as an admixture has become widespread.

For example, JP6030283 (Nippon Shokubai) discloses a shrinkage reducing agent comprising a polyoxyalkylene glycol with a molecular weight from 400 to 10'000 g/mol and a defoamer which is selected from the group consisting of mineral oil defoamer, oil/fat defoamer, fatty acid defoamer, fatty acid ester defoamer, oxyalkylene defoamer, alcohol defoamer, amide defoamer, phosphoric acid ester defoamer, metal soap defoamer, and silicone defoamer.

Furthermore, WO 2012/162292 (Premier Magnesia LLC) discloses the blending of shrinkage reduction admixtures, selected from alkylene glycols or poly(oxyalkylene)glycols, with expansive MgO and super absorbent polymers, which can be selected from cellulose, carboxymehtyl cellulose, starches, isobutylene maleic anhydride, polyvinyl alcohols, polyacrylonitriles, polyacrylics, and polyacrylamides, for the reduction of shrink cracking of Portland cement based mortar and concretes.

Finally, US 2010/0285224 (Fisher) discloses the use of a mixture comprising hydrogels, which can also be considered to be super absorbent polymers, especially as aqueous slurries of polyethylene glycol, glycerin, super absorbent polymers, and granulated ground blast furnace slag for the internal curing of pervious concrete.

However, previously known methods and materials to reduce shrinkage of mineral binder compositions are often expensive, complicated to use, or have limited effectiveness. There is therefore still a need for new and more effective methods and materials for the reduction of shrinkage of mineral binder compositions.

DESCRIPTION OF THE INVENTION

The object of the present invention is therefore to overcome the disadvantages mentioned above. In particular, an improved admixture for the reduction of shrinkage of mineral binder compositions is provided. The admixture should not reduce the workability, the setting behavior and the strength development of the hardening mineral binder compositions. Furthermore, advantageous methods, uses and mineral binder compositions are to be provided which enable efficient reduction of shrinkage.

Surprisingly, it has been found that the object of the invention can be achieved according to claim 1 by an admixture for mineral binder compositions, in particular a shrinkage reducing admixture for mineral binder compositions, comprising at least one super absorbing polymer SAP and at least one defoamer D.

It has been found that admixtures according to the present invention are extremely efficient for ensuring dimensional stability, especially by reducing the shrinkage of mineral binder compositions. Tests have shown that the admixtures according to the present invention reduce the shrinkage of mineral binder compositions, e.g. concrete compositions, and significantly reduce cracking. The latter both during the setting and hardening period and in the cured state. Undesirable drying of the mineral binder compositions can be effectively avoided.

It is therefore not necessary to wet or cover, for example with wet sheets or plastic covering, the surface of a freshly applied mineral binder composition comprising the admixture of the present invention which greatly facilitates production processes as compared to current standard practices.

Furthermore, mineral binder compositions comprising an admixture of the present invention develop a smoother and more homogeneous surface texture upon hardening as compared to the same mineral binder composition without the respective admixture.

It has further been found that the admixtures according to the present invention do not prolong the setting and do not reduce the strength development of mineral binder compositions.

An admixture of the present invention can, for example, be added directly to the mixing water. A prior grinding with cement components is therefore not necessary, which greatly simplifies the use. It has also been found that the admixture of the present invention is compatible with other typical additives for mineral binder compositions.

Further aspects of the invention are subject of further independent claims. Particularly preferred embodiments of the invention are subject matter of dependent claims.

WAYS OF CARRYING OUT THE INVENTION

A first aspect of the present invention relates to an improved admixture for the reduction of shrinkage of mineral binder compositions comprising at least one super absorbent polymer SAP and at least one defoamer D.

A "mineral binder composition" as used in the context of the present invention refers to a mixture comprising at least one mineral binder. It is possible, and in the context of the present invention also preferred, that the mineral binder composition additionally comprises aggregates and/or other additives. A mineral binder composition of the present invention can be essentially free of water and be present in dry form. A mineral binder composition of the present invention can likewise comprise part or all of the mixing water and be present as a fluid or in stiffened form.

A "mineral binder" within the context of the present invention is a binder, in particular an inorganic binder, which reacts in the presence of water in a hydration reaction to solid hydrates or hydrate phases. This may be, for example, a hydraulic binder (e.g. cement or hydraulic lime), a latent hydraulic binder (e.g. slag or blastfurnace slag), a pozzolanic binder (e.g. fly ash, trass or rice husk ash), or a non-hydraulic binder (gypsum or white lime). Mixtures of the various binders are also possible.

In particular, the mineral binder comprises a hydraulic binder, preferably cement. Particularly preferred is a cement with a cement clinker content of 35 wt Preferably, the cement is of the type CEM I, CEM II, CEM III, CEM IV, CEM V (according to standard EN 197-1) or a calcium aluminate cement (according to the standard EN 14647: 2006-01) or a calcium sulphoaluminate cement or a mixture thereof. In particular, the cement is of the type CEM I, CEM II, calcium sulphoaluminate cement or a mixture thereof. Of course, cements produced according to relevant alternative standards, for example the relevant ASTM or Chinese standards, are likewise suitable. Furthermore, white cement can be used as a mineral binder of the present invention.

A proportion of the hydraulic binder in the total mineral binder is preferably at least 5 wt.-%, more preferably at least 20 wt.-%, still more preferably at least 35 wt.-%, in particular at least 65 wt.-%. According to a further advantageous embodiment, the mineral binder consists to at least 95% by weight of hydraulic binding agent, in particular of cement.

However, it can also be advantageous if the mineral binder comprises other binders in addition to or instead of a hydraulic binder. These are in particular latent hydraulic binders and/or pozzolanic binders. Suitable latent hydraulic and/or pozzolanic binders are e.g. slag, fly ash and/or silica fume. Likewise, the binder composition may include inert substances such as e.g. limestone powder, quartz powder and/or pigments.

According to embodiments the mineral binder additionally comprises up to 40 wt.-%, preferably up to 35 wt.-%, especially up to 20 wt.-%, each based on the total dry weight of the mineral binder, of a calcium sulfate. The calcium sulfate may be present in the form of calcium sulfate-hemihydrate, calcium sulfate-dihydrate and/or anhydrite. In an especially advantageous embodiment, the calcium sulfate is interground with the hydraulic binder, especially the cement.

Additionally, a mineral binder, especially a cement, of the present invention may comprise cement improvers chosen from the group consisting of grinding aids, strength improvers, activators, accelerators, plasticizers and superplasticizers. Cement improvers may be interground with the mineral binder during milling. They may likewise be admixed to the milled mineral binder.

The admixture of the present invention comprises at least one super absorbent polymer SAP. An SAP within the context of the present invention is a polymer which can absorb, retain, and release large amounts of a liquid, especially of water, relative to its own mass. An SAP may thus absorb up to 500 times its own weight of water and may swell to a considerable degree.

An SAP of the present invention may be characterized by a water absorbency under a load of 40 $g/cm^2$ of at least 15 g/g polymer, preferably at least 20 g/g polymer, more preferably at least 22 g/g polymer. An SAP of the present invention may also release part or all of the absorbed water.

According to embodiments, the SAP of the present invention is a solid, preferably a fine powder. In the preferred case of the SAP being a powder, the said powder is characterized by a particle size distribution with particle sizes of the SAP of between 20-3000 µm, preferably between 50-1000 µm, more preferably between 90-850 µm. The particle size distribution may be obtained by sieving the powder through sieves with different openings. The particle size distribution can be determined by a method as described in ASTM C136 and ASTM C117.

The at least one SAP of the present invention is selected from the list consisting of polyacrylamide, polyacrylonitrile, polyvinyl alcohol, isobutylene maleic anhydride copolymers, polyvinylpyrrolidone, homo- and copolymers of monoethylenically unsaturated carboxylic acids, such as (meth)acrylic acid, crotonic acid, sorbic acid, maleic acid, fumaric acid, itaconic acid, preferably polyacrylic acid, which can be partially or fully neutralized, and co- and terpolymers of the said monoethylenically unsaturated carboxylic acids with vinylsulfonic acid, (meth)acrylamidoalkylsulfonic acid, allylsulfonic acid, vinyltoluenesulfonic acid, vinylphosphonic acid, (meth)acrylamide, N-alkylated (meth)acrylamide, N-methylol(meth)acrylamide, N-vinylamide, N-vinylformamide, N-vinylacetamide, vinylpyrrolidon, hydroxyalkyl(meth)acrylate, ethylacrylate, methylacrylate, (meth)acrylic acid esters of polyethyleneglycolmonoallylethers, vinylacetate and/or styrene.

The mentioned homo- and copolymers can be linear or branched, copolymers may be random, blocked or have a gradient. Preferred homo- and copolymers are additionally crosslinked.

A method for the production of the above mentioned polymers is described in DE19529348 which is hereby incorporated by reference. Preferred SAP within the context of the present invention are polyacrylic acids which can be partially or fully neutralized and which are crosslinked.

According to embodiments, the at least one SAP has a content of nitrogen of not more than 4 wt.-%, preferably not more than 2 wt.-%, especially not more than 1 wt.-%, in each case relative to the total dry weight of the SAP.

According to embodiments, the at least one SAP of the present invention consists to at least 70 wt.-%, preferably at least 80 wt.-%, more preferably at least 90 wt.-%, especially at least 98 wt.-%, each based on the total dry weight of the at least one SAP, of a polymer as described above.

Especially, the SAP is chemically different from the superplasticizers as described below. This is especially the case for the PCE superplasticizers.

Suitable SAP can, for example, be obtained under the brand name Starvis® from BASF or under the brand name Sanwet from Sanyo Chemical.

The admixture of the present invention further comprises at least one defoamer D.

The at least one defoamer D is selected from the list consisting of oil based defoamers, especially mineral oil, vegetable oil, or white oil based defoamers which may comprise a wax and/or hydrophobic silica, silicone based defoamers, which can be modified by, for example, alkoxylation or fluorination, alkyl esters of phosphoric or phosphonic acid, alkoxylated polyols, especially ethoxylated diols, fatty acid based defoamers, especially mono- and diglycerides of fatty acids, alkoxylated fatty alcohols or mixtures thereof.

Defoamers D can be used as liquids or powders, preferably as liquids.

According to embodiments, the at least one defoamer D is selected from ethoxylated 2,4,7,9-tetramethyl-5-decyn-4,7-diol, a combination of fatty alcohol alkoxylate and polysiloxane, or a combination of a mineral oil and a silicone oil comprising hydrophobic silica.

Suitable defoamers D can, for example, be commercially obtained under the brand name Ashland Drew from Ashland, under the brand name Agitan from Münzing Chemie or under the brand name Carbowet from Air Products.

The weight ratio of the at least one SAP to the at least one defoamer D in an admixture of the present invention is from 2:1-1:10, preferably 1:1-1:8, more preferably from 1:2-1:5.

According to embodiments, a weight ratio of the at least one SAP to the at least one defoamer D can thus be 2:1, 1:1, 1:2, 1:3, 1:4, 1:5, 1:6, 1:7, 1:8, 1:9, or 1:10. It is also possible for the weight ratio to be between 1:1.1-1:10 or 1.5:1-1:10. Another useful weight ratio is within a range of 2:1-1:5:1. Other useful weight ratios of the at least one SAP to the at least one defoamer D are 1:2.5 or 1:7.5.

According to embodiments, an admixture of the present invention may be in form of a dry powder, in the form of an aqueous solution or dispersion, or in the form of two or more separate components which may, independently of each other, be in the form of a powder or a liquid.

If the admixture of the present invention is provided in the form of an aqueous solution or dispersion it is preferred that the total content of the at least one SAP and the at least one defoamer D is up to 85 wt.-%, preferably up to 66 wt.-%, especially up to 50 wt.-%, each based on the total weight of the admixture.

Without being wished to be bound by theory, it is believed that the at least one SAP functions as a small water-comprising sponge and counteracts the self-dryout of the hardening mineral binder composition thus effectively reducing shrinkage. It is further believed, that the combination of the at least one superabsorbent polymer SAP and the at least one defoamer D leads to a particularly efficient and homogeneous dispersion of the SAP in the mineral binder composition and thus to a particularly high reduction of shrinkage.

In another aspect the present invention relates to a mineral binder composition as described above and which comprises at least one SAP and at least one defoamer D as described above.

According to embodiments the mineral binder composition comprises the at least one SAP of the present invention in an amount of 0.01-0.5 wt.-%, preferably 0.02-0.25 wt.-%, more preferably 0.05-0.2 wt.-%, and the at least one defoamer D in an amount of 0.05-2 wt.-%, preferably 0.1-1 wt.-%, more preferably 0.25-0.8 wt.-%, each based on the total dry weight of the mineral binder composition.

Preferably, the mineral binder composition of the present invention comprises aggregates. Aggregates can be any material that is non-reactive in the hydration reaction of mineral binders. Aggregates can be any aggregate typically used for mineral binder compositions, especially cementitious binder compositions. Typical aggregates are for example rock, crushed stone, gravel, slag, sand, especially quartz sand, river sand and/or manufactured sand, recycled concrete, glass, expanded glass, pumice, perlite, vermiculite, and/or fine aggregates such as ground limestone, ground dolomite, ground aluminum oxide, silica fume, quartz flour and/or ground steel slag. Aggregates useful for the present invention can have any shape and size typically encountered for such aggregates.

Preferably, the mineral binder composition of the present invention comprises at least one fine aggregate, especially ground limestone. Aggregates, useful for the present invention, are as described for example in EN 12620:2008-07 and EN13139:2015-07. Aggregates typically are characterized by their particle size distribution which can be measured by sieve analysis as set out in methods ASTM C136 and C117.

The particle size of the aggregates depends on the application and is in the range of 0.1 μm to 32 mm and more. Aggregate with different particle sizes are preferably mixed in order to optimize the properties of the mineral binder composition. It is also possible to use aggregates of different chemical composition.

According to embodiments, aggregates having particle sizes of not more than 8 mm, more preferably not more than 5 mm, still more preferably not more than 3.5 mm, most preferably not more than 2.2 mm, especially not more than 1.2 mm or not more than 1.0 mm are used in a mineral binder composition of the present invention.

The maximum particle size is limited in particular by the planned layer thickness during application of the mineral binder composition mixed with water. For example, a maximum particle size of the aggregate should be the same as the layer thickness during application. This is in particular the case where the mineral binder composition is applied in a method of additive manufacturing.

According to embodiments, the mineral binder composition of the present invention comprises up to 85 wt.-%, preferably 30-80 wt.-%, more preferably 40-70 wt.-%, each based on the total weight of the mineral binder composition, of aggregates, preferably of sand, especially of quartz sand, and/or of a fine carbonate, especially of a fine calcium carbonate and/or magnesium carbonate.

According to embodiments, sand with a particle size of less than 1 mm, preferably less than 0.8 mm is used for a mineral binder composition of the present invention.

According to an especially preferred embodiment, a mineral binder composition of the present invention comprises a mixture of sand, especially of quartz sand, and/or of a fine carbonate, especially of a fine calcium carbonate and/or magnesium carbonate, said carbonates having a particle size of less than 0.125 mm. In this case, the aggregates comprise sand in an amount of from 40-98 wt.-%, preferably 50-95 wt.-%, especially 60-90 wt.-% and fine carbonates in an amount of from 2-60 wt.-%, preferably 5-50 wt.-%, especially 10-40 wt.-%, each based on the total dry weight of the aggregate. The fine carbonates improve the processability of the mineral binder composition mixed with water and can increase the strength development of the binder composition.

Mineral binder compositions having particle sizes of this type and mixed with water can be readily conveyed, are readily mixed with an admixture of the present invention in a continuous manner, and give a very homogeneous surface after application.

In special applications, aggregates with particle sizes up to 32 mm, more preferably up to 20 mm, most preferably up to 16 mm, can also be used.

A mineral binder composition advantageously further comprises additives common in the mortar and/or concrete industry such as for example plasticizers and/or superplasticizers, air entrainers, stabilizers, viscosity modifiers, water reducers, accelerators, retarders, water resisting agents, strength enhancing additives, fibres, blowing agents, pigments, corrosion inhibitors, etc. It can be advantageous to combine two or more of the mentioned additives in one mineral binder composition. An additive for a mineral binder composition within the meaning of the present context is different in chemical composition and structure from any SAP or defoamer D as defined herein.

A mineral binder composition of the present invention thus comprises
- a) 10-65 wt.-%, preferably 12-55 wt.-%, especially 15-50 wt.-% of at least one mineral binder,
- b) 0.01-0.5 wt.-%, preferably 0.02-0.25 wt.-%, more preferably 0.05-0.2 wt.-% of at least one SAP,
- c) 0.05-2 wt.-%, preferably 0.1-1 wt.-%, more preferably 0.25-0.8 wt.-% of at least one defoamer D,
- d) 0-85 wt.-%, preferably 30-80 wt.-%, more preferably 40-70 wt.-% of aggregates, preferably of sand and/or a fine carbonate, especially a fine calcium carbonate and/or magnesium carbonate,
- e) 0-10 wt.-%, preferably 0.1-7 wt.-%, more preferably 0.2-5 wt.-% of other additives selected from the group consisting of plasticizers, superplasticizers, accelerators, retarders, rheology modifiers, especially thickeners, anti-settling agents, pigments, corrosion inhibitors, fibers, strength enhancers, waterproofing additives, alkali-aggregate reaction inhibitors, chromate reducers, and/or anti-microbial agents, and
- f) optionally water, each based on the total dry weight of the mineral binder composition.

According to embodiments, a mineral binder composition of the present invention comprises a superplasticizer selected from the group consisting of lignosulfonates, sulfonated vinylcopolymers, polynaphthalene sulfonates, sulfonated melamine formaldehyde condensates, polyethylene oxide phosphonates, polycarboxylate ethers (PCE), or mixtures thereof. Preferably, a mineral binder composition of the present invention comprises a PCE.

According to embodiments, the PCE comprises carboxylic acid groups in the form of free, that is not neutralized, carboxylic acid groups and/or in the form of their alkali and/or alkaline earth metal salts. Preference is given to a PCE which, apart from the carboxylic acid groups, no longer has any further anionic groups. Further preferred is a PCE whose side chains consist of at least 80 mol %, preferably at least 90 mol %, especially preferably 100 mol %, of ethylene glycol units. Preferably, the side chains have an average molecular weight Mw in the range of 500 to 10'000 g/mol, preferably 800 to 8'000 g/mol, especially preferably 1'000 to 5'000 g/mol. Side chains of different molecular weights may also be present in the PCE. Most preferably, the PCE is composed of (meth)acrylic acid and methyl polyalkylene glycol (meth)acrylates. The PCE preferably has an average molecular weight Mw of 8'000 to 200'000 g/mol, especially 10'000 to 100'000 g/mol, measured against PEG standards.

Such PCE are particularly well suited to allow good processability of the binder composition even at low water content. A low water content causes a high strength of a hardened mineral binder composition.

According to embodiments, the PCE is incorporated into the mineral binder composition as an aqueous solution, for example by spraying onto the aggregates prior to mixing with the mineral binder. Preferably, the PCE is present as a polymer powder in the dry mineral binder composition. According to preferred embodiments, the mineral binder composition of the present invention comprises a PCE in an amount of 0.02-1.0 wt.-%, preferably 0.05-0.8 wt.-%, especially 0.1-0.5 wt.-%, each calculated as dry weight of the PCE and based on the total dry weight of the mineral binder composition.

According to embodiments, a mineral binder composition of the present invention comprises an accelerator selected from the group consisting of aminoalcohols, alkali or alkaline earth metal nitrates, alkali or alkaline earth metal nitrites, alkali or alkaline earth metal thiocyanates, alkali or alkaline earth metal halogenides, glycerine, derivatives of glycerine, aluminum sulfate, aluminum hydroxide, alkali or alkaline earth metal hydroxides, alkali or alkaline earth metal silicates, alkali or alkaline earth metal oxides, alkali or alkaline earth metal salts of formic acid, or mixtures thereof.

According to embodiments, a mineral binder composition of the present invention comprises a thickener selected from the group consisting of starch, pectin, amylopectin, modified starch, cellulose, modified cellulose, such as carboxymethylcellulose, hydroxymethylcellulose, hydroxyethylcellulose, methylhydroxyethylcellulose, casein, xanthan gum, diutan gum, welan gum, galactomannanes, such as guar gum, tara gum, fenugreek gum, locust bean gum or cassia gum, alginates, tragacanth gum, dextran, polydextrose, layered silicates such as sepiolite, and mixtures thereof.

It is preferred that the total amount of thickener is equal to or less than 1 wt.-%, more preferred equal to or less than 0.75 wt.-%, especially equal to or less than 0.6 wt.-%, each based on the total dry weight of the mineral binder composition. It is especially preferred that the total amount of starch, modified starch, cellulose, and modified cellulose is equal to or less than 1 wt.-%, in particular equal to or less than 0.5 wt.-%, each based on the total dry weight of the mineral binder composition.

According to embodiments, a mineral binder composition of the present invention comprises a retarder selected from the group consisting of sugar acids, sugars, sugar alcohols, hydroxycarboxylic acids or their salts, phosphates, phosphonates, borates and amines. Preferably, the retarder is sodium gluconate.

In an especially preferred embodiment of the present invention, the mineral binder composition comprises a mineral binder selected from CEM I or CEM II as described above and an additional amount of a calcium sulfoaluminate (CSA) cement.

A CSA cement of the present invention is a cement with a main phase consisting of $C_4(A_{3-x}F_x)_3\$$ ($4\ CaO \cdot 3\text{-}x\ Al_2O_3 \cdot x\ Fe_2O_3 \cdot CaSO_4$) where x is an integer of from 0-3. CSA cements of the present invention typically comprise further phases selected from aluminates (CA, $C_3A$, $C_{12}A_7$), belite ($C_2S$), ferrites ($C_2F$, $C_2AF$, $C_4AF$), ternesite ($C_5S_2\$$) and anhydrite. In the present context C stands for CaO, A stands for $Al_2O_3$, F stands for $Fe_2O_3$, and \$ stands for $CaSO_4$.

According to certain embodiments CSA cements of the present invention comprise 20-75 wt.-%, preferably 25-50 wt.-% $C_4A_3\$$, 0-10 wt.-%, preferably 1-5 wt.-% aluminates, 0-70 wt.-%, preferably 1-50 wt.-% belite, 0-35 wt.-%, preferably 1-10 wt.-% ferrites, 0-20 wt.-%, preferably 1-10 wt.-% ternesite, 0-50 wt.-%, preferably 5-45 wt.-% anhydrite, and 0-25 wt.-% CaO, preferably 1-20 wt.-% CaO, each based on the total dry weight of the CSA cement.

The mineral binder composition of the present invention thus preferably comprises 10-65 wt.-%, preferably 12-55 wt.-%, especially 15-50 wt.-%, each based on the dry weight of the mineral binder composition, of a mixture of mineral binders, preferably a mixture comprising a CEM I and/or CEM II, and a CSA cement.

Preferably, the mineral binder composition thus comprises 0.1-8 wt.-%, more preferably 0.5-5 wt.-%, especially 1.2-3 wt.-%, each based on the dry weight of the mineral binder composition, of a CSA cement and 2-64.9 wt.-%, preferably 4-60 wt.-%, especially 12-48.8 wt.-%, each based on the dry weight of the mineral binder composition, of a CEM I and/or a CEM II.

According to particularly preferred embodiments a mineral binder composition of the present invention thus comprises
1) 2-64.9 wt.-%, preferably 4-60 wt.-%, especially 12-48.8 wt.-% of a CEM I or a CEM II,
2) 0.1-8 wt.-%, more preferably 0.5-5 wt.-%, especially 1.2-3 wt.-%, of a CSA cement,
3) 0.01-0.5 wt.-%, preferably 0.02-0.25 wt.-%, more preferably 0.05-0.2 wt.-% of at least one SAP,
4) 0.05-2 wt.-%, preferably 0.1-1 wt.-%, more preferably 0.25-0.8 wt.-% of at least one defoamer D,
5) 0-85 wt.-%, preferably 30-80 wt.-%, more preferably 40-70 wt.-% of aggregates, preferably of sand and/or a fine carbonate, especially a fine calcium carbonate and/or magnesium carbonate,
6) 0-10 wt.-%, preferably 0.1-7 wt.-%, more preferably 0.2-5 wt.-% of other additives selected from the group consisting of superplasticizers, accelerators, retarders, thickeners, and
7) optionally water, each based on the total dry weight of the mineral binder composition.

According to embodiments an admixture of the present invention is added to the dry mix of a mineral binder composition. A "dry mix" within the present context refers to a mineral binder composition with a moisture content of not more than 0.5 wt.-%, based on the total weight of the mineral binder composition. In such a case it is preferred that the admixture does not comprise water. The storage stability of a dry mix comprising an admixture of the present invention will be increased if no water is introduced. Mixing can be done by any process known to the person skilled in the art for the production of dry mortars. There are no particular limitations as to the order of addition for mixing. Suitable mixers may be horizontal single shaft mixers, twin shaft paddle mixers, vertical shaft mixers, ribbon blenders, orbiting mixers, change-can mixers, tumbling vessels, vertical agitated chambers or air agitated operations. Mixing can be continuously or batch-wise.

According to further embodiments an admixture of the present invention is added to a mineral binder composition together with the mixing water. In such a case it is preferred that the admixture is in the form of an aqueous solution or dispersion or is readily soluble or dispersible in the mixing water. The admixture of the present invention can be premixed with part or all of the mixing water and then mixed with the mineral binder composition. It may likewise be mixed with the mineral binder composition together with the mixing water without any pre-mixing.

Mixing can be continuously or batch-wise, preferably continuously. Continuous mixing offers the advantage of a high production speed. Additionally, already mixed material from a batch process must be discarded in case of a production stop. Continuous mixing of a mineral binder composition with the admixture of the present invention and mixing water is possible by means of static mixers or dynamic mixers or combinations of both.

According to yet further embodiments an admixture of the present invention is added to the mineral binder composition shortly after the mixing water, preferably in a continuous manner as described above.

Upon mixing with water the mineral binder composition starts to harden.

An admixture of the present invention can be used to ensure dimensional stability and especially to reduce the shrinkage of a mineral binder composition, especially a cementitious binder composition. An admixture of the present invention can likewise be used to improve the surface texture of a hardened mineral binder composition. A mineral binder composition of the present invention may thus have, for example, a smoother surface and/or less visual defects, as compared to the same mineral binder composition without the at least one SAP and the at least one defoamer D. An improved surface texture may lead to simplified subsequent treatments of said surface such as tooling, coating, painting, rendering, etc.

A mineral binder composition of the present invention can be mixed with water, brought into a desired shape, and cured to produce hardened articles.

The invention therefore also relates to a method of producing a hardened article comprising the steps of
1) mixing a mineral binder composition of the present invention with water
2) optionally conveying the mixture obtained in 1) to the location of placing
3) placing the mixture obtained in 1) into any desired shape
4) curing the mixture obtained in 1).

Water can be any water available such as distilled water, purified water, tap water, mineral water, spring water, and well water. The use of waste water is possible only in cases where the composition of such waste water is known and where none of the impurities comprised may impart the functionality of any other component of the composition of the present invention. The use of salt water is not possible due to its high content of chlorides and the risk of corrosion of steel reinforcement associated therewith.

The amount of water needed to cure a mineral binder composition of the present invention is 10-30 wt.-%, preferably 10-20 wt.-%, each based on the total dry weight of the mineral binder composition.

According to embodiments, the water comprises part or all of the one or more additives selected from the group consisting of plasticizers, superplasticizers, accelerators, retarders, rheology modifiers, especially thickeners, anti-settling agents, pigments, corrosion inhibitors, fibers, strength enhancers, waterproofing additives, alkali-aggregate reaction inhibitors, chromate reducers, and/or anti-microbial agents, and which form part of the mineral binder composition as described above.

According to preferred embodiments, the water comprises part or all of the admixture of the present invention. It is preferred that in case the at least one SAP and the at least one defoamer D of the present invention are added together with the water, that the at least one SAP and the at least one defoamer D are water soluble or readily dispersible in water.

According to especially preferred embodiments the mineral binder composition is thus present in two or more components. A first component, which is a solid, comprising the at least one mineral binder, aggregates, optionally the at least one SAP and/or the at least one defoamer D, and optionally other additives, a second component, which is a liquid, comprising water and optionally the at least one SAP and/or the at least one defoamer D, and optionally other additives, and wherein the at least one SAP and the at least one defoamer D are either comprised in the first component or the second component, and optionally a third component, which is a liquid, comprising a superplasticizer, an accelerator, a thickener, and/or a retarder, which are as described above, and optionally water.

Mixing of the components as described before can be done by any process known to the person skilled in the art. Mixing can be batch-wise, semi-continuous, or continuous. Suitable mixing tools include horizontal single shaft mixers, twin shaft paddle mixers, vertical shaft mixers, ribbon blenders, orbiting mixers, change-can mixers, tumbling vessels, vertical agitated chambers, air agitated operations, hobart mixers, portable concrete mixers, mixing trucks, mixing buckets, paddle mixers, jet mixers, screw mixers, screw-extruders, or auger mixers.

It is further possible to mix a mineral binder composition of the present invention with water, said water optionally comprising further additives and/or the admixture of the present invention by means of a static mixer or a dynamic mixer.

In a preferred embodiment of the present invention, a static mixer is used for mixing the components. In a static mixer, mixing elements are arranged in a jacket that provide for a homogeneous intermixing of components by using the flow energy of the components which are fed into the static mixer under pressure. Static mixers are easy to use, cheap and are particularly suited for one-way use which is of advantage, especially for the do-it-yourself market.

According to another preferred embodiment the components as described above are mixed in a semi-continuous or continuous manner. The components are usually dosed in the pre-defined amount through at least one dosing device, for example a conveyor belt or screw conveyor, which is able to convey the desired amount of the components in mass or volume in the desired speed to a mixer. It is especially preferred, that there are two separated dosing devices, with the first dosing device being integrated into a mixer, and the second dosing device being integrated into a dispensing equipment, for example a nozzle. By this, an especially steady conveying of the mixture as well as a flexible adjustment of the hardening mineral binder composition is possible.

In the mixing device, which may be static or dynamic or a combination of both, the components are mixed and the fresh mix is conveyed through a dispensing equipment, for example a nozzle, and is placed at a pre-defined position.

It has been shown that, on the one hand, a mineral binder composition of the present invention can be mixed in this manner in the mixing device and at the same time conveyed in mixed form out of the mixing device.

A paste-like consistency of the mineral binder composition after mixing with water is advantageous for an easy conveying of the material to and through the mixing and dispensing equipment, for example a nozzle. These are especially important properties for the use in an automated process, for example by a robotic system.

The placing of the mineral binder composition of the present invention can be done in an automated process, for example by a robotic system. A robotic system typically places the mineral binder composition in several layers in a process also known as additive manufacturing. A mineral binder composition of the present invention can thus be used in additive manufacturing.

It is advantageous if a mineral binder composition of the present invention when used for additive manufacturing comprises the above mentioned components of said mineral binder composition in such ratios to ensure that the freshly mixed mineral binder composition, when leaving the mixer, is still in a plastic state, so that it is formable by the dispensing equipment, for example a nozzle, is non-sagging and self-supporting and has sufficient yield stress and/or fast development of compressive strength to support the next layers of freshly mixed mineral binder composition, which are applied on top after a short period of time.

According to embodiments, the surface of the mineral binder composition of the present invention is wetted, for example by application of water, wet sheets or plastic covering, after the placement. It is, however, not necessary to wet or cover the surface of a freshly applied mineral binder composition of the present invention. According to preferred embodiments, the mineral binder composition is thus not wetted, for example by application of water, wet sheets or plastic covering, after the placement.

The mineral binder composition of the present invention can be used for construction, pre-cast elements, repair and refurbishment and is suited for the professional as well as do-it-yourself use. The low shrinkage of a mineral binder composition of the present invention makes it especially useful in applications where large elements or elements with one long preferential axis are produced. The present invention therefore also relates to a shaped article, for example a pre-cast element, an edifice or a part of a building, obtainable by curing a mineral binder composition comprising an admixture as described above.

BRIEF DESCRIPTION OF DRAWINGS

FIG. 1 shows the surface of example 8 after 7d of hardening. The crack in the surface is clearly visible.

FIG. 2 shows the surface of example 9 after 7d of hardening. No cracks in the surface are visible.

The following working examples illustrate the invention. The examples are not intended to limit the scope of the invention in any way.

EXAMPLES

Examples 1-7

1500 g of Ordinary Portland Cement (CEM I, 52.5N), 2250 g of quartz sand (particle size 0.06-0.3 mm), and 1100 g of calcium carbonate (average particle size 40 μm) were mixed in a Hobart mixer for 1 minute at 23° C. and 50% relative humidity to make dry mix 1.

1500 g of Ordinary Portland Cement (CEM I, 52.5N), 100 g of calcium sulfoaluminate cement (Denka CSA #20), 2250 g of quartz sand (particle size 0.06-0.3 mm), and 1100 g of calcium carbonate (average particle size 40 μm) were mixed in a Hobart mixer for 1 minute at 23° C. and 50% relative humidity to make dry mix 2.

20 g of a polycarboxylate ether (40% in water, polyacrylate backbone with Mn=7'000 g/mol, methyl-terminated PEG side chain with Mn=2'500 g/mol, carboxylate/ester ratio=3) were then added to the respective dry mix as given in table 1 below together with the additives from table 1 below and with 800 g of water and mixing was continued for 2 minutes. Total mixing time was appr. 3 minutes.

TABLE 1

| | Example | | | | | | |
|---|---|---|---|---|---|---|---|
| | 1 (Ref) | 2 (Ref) | 3 (Ref) | 4 | 5 | 6 (Ref) | 7 (Ref) |
| Dry mix | 1 | 2 | 2 | 2 | 2 | 2 | 2 |
| dry mix weight [g] | 4850 | 4950 | 4950 | 4950 | 4950 | 4950 | 4950 |
| Defoamer D [g] | | | 25* | 25* | 25** | 25** | |

TABLE 1-continued

| | Example | | | | | | |
|---|---|---|---|---|---|---|---|
| | 1 (Ref) | 2 (Ref) | 3 (Ref) | 4 | 5 | 6 (Ref) | 7 (Ref) |
| SAP [g] | | | | 10 | 10 | | 10 |
| NPG [g] | | | | | | | 25 |
| Thickener [g] | | | 5*** | | | 5*** | |

NPG: neopentylglycol (Sigma Aldrich, 99% purity)
SAP: Starvis S5514F
*mixture of mineral oil and silicone oil with hydrophobic silica
**ethoxylated 2,4,7,9-tetramethyl-5-decyn-4,7-diol
***methylhydroxyethylcellulose Examples 4 and 5, of the above table 1 are according to the present invention. Examples 1-3, and 6-7 are comparative examples not according to the present invention.
The following table 2 gives an overview of the results.
Linear shrinkage was measured according to EN 12617-4 on prisms of 40×40×160 mm within 8 h and 16 h of mixing with water.

TABLE 2

| | Example | | | | | | |
|---|---|---|---|---|---|---|---|
| | 1 | 2 | 3 | 4 | 5 | 6 | 7 |
| Linear shrinkage @8 h [μm/m] | −936 | −607 | −790 | −230 | −850 | −1880 | −950 |
| Linear shrinkage @16 h [μm/m] | −948 | −612 | −638 | +100 | −700 | −1581 | −1020 | n.m.: not measured

As can be seen from the above results, the inventive example 4 shows a reduced linear shrinkage as compared to the comparative examples 1-3. Also inventive example 5 shows a lower shrinkage in comparison to comparative examples 1 and 6.
Comparative example 7 shows that the use of neopentylglycol, an example of an alkylene glycol, cannot reduce the shrinkage.

Examples 8-9

450 g of white Portland Cement (CEM I, 52.5N), 30 g of calcium sulfoaluminate cement (Denka CSA #20), 195 g of fine quartz sand (particle size 0.075-0.3 mm), 435 g of quartz sand (particle size 0.06-0.8 mm), 364 g of calciumcarbonate (average particle size 50 μm), and 2.25 g of a powdered polycarboxylate ether (polyacrylate backbone with Mn=5'000 g/mol, Me-terminated PEG side chain with Mn=2'700 g/mol, carboxylate/ester ratio=5.6) were mixed in a Hobart mixer for 1 minute at 23° C. and 50% relative humidity to make a dry mix. The additives from table 3 below were added to the dry mix together with 240 g of water and mixing was continued for 2 minutes. Total mixing time was appr. 3 minutes.

TABLE 3

| | Example | |
|---|---|---|
| | 8 (Ref) | 9 |
| Defoamer D [g] | 7.5* | 7.5* |
| SAP [g] | | 1 |
| Thickener [g] | 3** | 0.04** |
| | 0.15*** | 0.15*** |

TABLE 3-continued

| | Example | |
|---|---|---|
| | 8 (Ref) | 9 |

SAP: Starvis S5514F
*ethoxylated 2,4,7,9-tetramethyl-5-decyn-4,7-diol
**methylhydroxyethylcellulose
***Kelco-crete DGF As can be seen from the FIGS. 1 and 2, example 8, which is not according to the present invention, does show cracking. Whereas example 9, which is according to the present invention, does not show cracking.

Examples 10-11

Examples 10 and 11 were prepared in the same way as example 4. However, the amounts of SAP and defoamer D were adjusted as can be seen from the following table 4. Example 10 is a reference which is not according to the present invention while example 11 is according to the present invention. Linear shrinkage testing of examples 10 and 11 was done as described above and results are included in table 4. These results show that inventive example 11 shows low linear shrinkage while comparative example 10, where the weight ratio of SAP to defoamer D is outside the preferred range, shows a high linear shrinkage.

TABLE 4

| | Example | |
|---|---|---|
| | 10 (Ref) | 11 |
| Dry mix | 2 | 2 |
| dry mix weight [g] | 4950 | 4950 |
| Defoamer D [g] | 10* | 75* |
| SAP [g] | 40 | 10 |
| Linear shrinkage @16 h [μm/m] | −1654 | −736 |

*mixture of mineral oil and silicone oil with hydrophobic silica

The invention claimed is:
1. An admixture for mineral binder compositions, comprising at least one superabsorbent polymer SAP and at least one defoamer D,
wherein the admixture does not comprise water,
wherein the at least one defoamer D is selected from the group consisting of mineral oils, vegetable oils, or white oils which may comprise a wax and/or hydrophobic silica, silicones, which can be modified by alkoxylation or fluorination, alkyl esters of phosphoric or phosphonic acid, alkoxylated polyols, and alkoxylated fatty alcohols, and
wherein the weight ratio of the at least one SAP to the at least one defoamer D is from 2:1-1:10.
2. The admixture according to claim 1, wherein the at least one superabsorbent polymer SAP is selected from the group consisting of polyacrylamide, polyacrylonitrile, polyvinyl alcohol, isobutylene maleic anhydride copolymers, polyvinylpyrrolidone, homo- and copolymers of monoethylenically unsaturated carboxylic acids, which can be partially or fully neutralized, and co- and terpolymers of the monoethylenically unsaturated carboxylic acids with vinylsulfonic acid, (meth)acrylamidoalkylsulfonic acid, allylsulfonic acid, vinyltoluenesulfonic acid, vinylphosphonic acid, (meth)acrylamide, N-alkylated (meth)acrylamide, N-methylol (meth)acrylamide, N-vinylamide, N-vinylformamide, N-vinylacetamide, vinylpyrrolidon, hydroxyalkyl

(meth)acrylate, ethylacrylate, methylacrylate, (meth)acrylic acid esters of polyethyleneglycolmonoallylethers, vinylacetate and/or styrene.

3. The admixture according to claim 1, wherein at least one superabsorbent polymer SAP is a polyacrylic acid which can be partially or fully neutralized and which is crosslinked.

4. The admixture according to claim 1, wherein the admixture is combined with an aqueous solution or dispersion, and the at least one SAP and the at least one defoamer D combined comprise an amount of up to 85 wt.-%, based on the total weight of the admixture and the aqueous solution or dispersion.

5. A mineral binder composition comprising the admixture according to claim 1, wherein the mineral binder composition includes:
   a) 10-65 wt.-% of at least one mineral binder,
   b) 0.01-0.5 wt.-% of the at least one SAP,
   c) 0.05-2 wt.-% of the at least one defoamer D,
   d) 0-85 wt.-% of aggregates,
   e) 0-10 wt.-% of other additives selected from the group consisting of plasticizers, superplasticizers, accelerators, retarders, rheology modifiers, anti-settling agents, pigments, corrosion inhibitors, fibers, strength enhancers, waterproofing additives, alkali-aggregate reaction inhibitors, chromate reducers, and/or anti-microbial agents, and
   f) optionally water,
each based on the total dry weight of the mineral binder composition.

6. A mineral binder composition according to claim 5, wherein the at least one mineral binder is a mixture of at least one CEM I or CEM II and at least one calcium sulfoaluminate cement.

7. A mineral binder composition according to claim 5, wherein the mineral binder comprises
   a) 0.1-8 wt.-%, each based on the dry weight of the mineral binder composition, of a CSA cement and
   b) 2-64.9 wt.-%, each based on the dry weight of the mineral binder composition, of a CEM I and/or a CEM II.

8. A mineral binder composition according to claim 5, wherein the mineral binder composition comprises
   a) 0.02-1.0 wt.-% of a polycarboxylate ether composed of (meth)acrylic acid and methyl polyalkylene glycol (meth)acrylates and having a molecular weight Mw of 8,000 to 200,000 g/mol and
   b) a maximum of 1 wt.-% of at least one thickener selected from the group consisting of starch, pectin, amylopectin, modified starch, cellulose, modified cellulose, casein, welan gum, xanthan gum, diutan gum, galactomannanes, alginates, tragacanth gum, dextran, polydextrose, and layered silicates, each based on the total weight of the mineral binder composition.

9. A method of producing a hardened article comprising the steps of
   1) mixing a mineral binder composition according to claim 5 with water,
   2) Optionally conveying the mixture obtained in 1) to the location of placing,
   3) Placing the mixture obtained in 1) into any desired shape,
   4) curing the mixture obtained in 1),
wherein step 1) is done in a continuous process by means of a static and/or dynamic mixer.

10. A process comprising forming an article by additive manufacturing from a material that includes a water-containing mineral binder composition of claim 5.

11. A shaped article obtainable by curing a mineral binder composition according to claim 5.

12. The admixture according to claim 1, wherein the at least one defoamer D is selected from the group consisting of ethoxylated 2,4,7,9-tetramethyl-5-decyn-4,7-diol, a combination of fatty alcohol alkoxylate and polysiloxane, and a combination of a mineral oil and a silicone oil comprising hydrophobic silica.

* * * * *